(12) United States Patent
Polevoy et al.

(10) Patent No.: US 6,685,379 B2
(45) Date of Patent: Feb. 3, 2004

(54) PLUG FOR KEYHOLE SLOTS

(75) Inventors: Richard S. Polevoy, Teaneck, NJ (US); Howard Scott Ryan, Skaneateles, NY (US); Paul Eric Carlson, Skaneateles, NY (US)

(73) Assignee: Finger Lakes Intellectual Property LLC, Teaneck, NJ (US)

( * ) Notice: Subject to any disclaimer, the term of this patent is extended or adjusted under 35 U.S.C. 154(b) by 0 days.

(21) Appl. No.: 10/166,901

(22) Filed: Jun. 11, 2002

(65) Prior Publication Data

US 2003/0024206 A1 Feb. 6, 2003

Related U.S. Application Data

(60) Provisional application No. 60/312,292, filed on Aug. 14, 2001, and provisional application No. 60/297,292, filed on Jun. 11, 2001.

(51) Int. Cl.[7] .................................................. F16B 9/00
(52) U.S. Cl. ...................................... 403/316; 403/353
(58) Field of Search ................................ 403/353, 316, 403/326, 315, 317, 327, 329

(56) References Cited

U.S. PATENT DOCUMENTS

| | | | | |
|---|---|---|---|---|
| 5,716,161 A | * | 2/1998 | Moore et al. | 403/326 |
| 5,791,502 A | * | 8/1998 | Bietz et al. | 403/316 X |
| 5,938,367 A | * | 8/1999 | Olson | 403/316 X |
| 6,196,758 B1 | * | 3/2001 | Scarborough | 403/353 |
| 6,203,234 B1 | * | 3/2001 | Olson | 403/316 X |

* cited by examiner

Primary Examiner—John R. Cottingham
(74) Attorney, Agent, or Firm—Klauber & Jackson

(57) ABSTRACT

A molded plug is provided that is used to lock structural members together where those members are joined together by the interengagement of a standoff rivet and a keyhole slot. In the normal interengagement of such structural members, a standoff rivet of one of the structural members is inserted into an enlarged portion of a keyhole slot on the other structural member and the structural members are moved relative to each other in order to slide the standoff rivet into the narrowed portion of the keyhole slot. When so positioned, the plug is inserted and locked into position within the enlarged portion of the keyhole slot and thus prevents any relative movement between the structural members to insure that the standoff rivet cannot again become aligned with the enlarged portion of the keyhole slot where inadvertent disengagement of the structural member could occur.

13 Claims, 2 Drawing Sheets

PLUG FOR KEYHOLE SLOTS

CROSS-REFERENCE TO RELATED APPLICATIONS

The present application is based upon U.S. Provisional patent application No. 60/312,292 filed Aug. 14, 2001 and entitled "PLUG FOR KEYHOLE SLOTS".

Claims the benefit of Provisional application No. 60/297,292 filed Jun. 11, 2001.

BACKGROUND OF THE INVENTION

The present invention relates to a means for affixing two structural members together, and, more particularly, to a plug that can be inserted into the enlarged portion of a keyhole slot to prevent the inadvertent detachment of those structural members.

A common method of affixing together structural members is by use of a keyhole slot that is formed in one of the members, into which is inserted a standoff rivet extending from the other member. Basically, the keyhole slot is one that has an enlarged portion and a narrowed portion extending therefrom. The enlarged portion may be a variety of geometrical configurations, including square, oval and the like but is preferably a round or circular shape. It is only important that the configuration and geometry of the enlarged portion be sufficiently sized to allow the head of the standoff rivet to pass therethrough.

The narrowed portion of the keyhole slot is generally an elongated oval configuration that is sized to allow the body of the rivet to slide therealong to a closed end but not allow the head of the standoff rivet to pass therethrough. While the elongated oval configuration of the narrowed portion may have parallel sides, the sides may also slightly taper inwardly in the direction of the closed, circular end.

Thus the joint between the two structural members is accomplished by simply inserting the head of the standoff rivet through the enlarged portion of the keyhole slot and displacing the members with respect to each other to slide that standoff rivet to the affixed position where the body of the rivet is relocated to the closed end of the narrowed portion, thereby joining the members together. As used, herein, the term "standoff rivet" will be used generically and the actual component can be any of a variety of projections that extend outwardly from one of the structural members having a smaller dimensioned portion and an outer, distal portion having larger dimensions and the actual configuration of the standoff rivet may be circular, square of any of a number of differing geometries.

One of the difficulties of such connections between structural members is that they may become loose, that is, the standoff rivet, once slid into the affixed position, can later move inadvertently such that the head of the standoff rivet is again aligned with the enlarged portion of the keyhole slot and can come loose, thereby causing the members to come apart.

There have been proposed a number of plugs that can interfit with two openings in structural members to prevent the relative movement between those members, including U.S. Pat. No. 3,392,848 of McConnell et al where a dual locking pin arrangement is utilized where one of the locking pins holds the device in the desired position while the other of the locking pins enters corresponding, aligned holes between the two structural members. The device, however, requires two plugs and also a metal spring that joins those two plugs together and therefore is not a simple, one piece molded part that can prevent relative movement between two structural members.

As another example, a metal spring clip device is shown and described in Klein, U.S. Pat. No. 5,131,781 that assists in the connection between a beam and a column and again, the device requires the alignment of two apertures through which a pin enters. Other devices of the type are constructed as a part of a locking mechanism or are spring loaded devices that pass between aligned members, such as shown in Olsen, U.S. Pat. No. 5,938,367 and Kautz et al, U.S. Pat. No. 6,241,109.

Accordingly, it would be advantageous if there were a device, such as a one piece, molded plug, that could be inserted into the keyhole slot to prevent the relative movement between the structural members and thus also prevent the inadvertent detachment of the members. It would be further advantageous for the plug to be inexpensive and yet be firmly and easily inserted into the keyhole slot to serve the aforementioned purpose by self locking in the enlarged portion of a keyhole slot formed in a structural member and which interfits with a standoff rivet in the other of the structural members.

SUMMARY OF THE INVENTION

Now, in accordance with the present invention, there is provided a relatively inexpensive plug to lock together two structure members that are affixed together by means of a standoff rivet of one structural member that is inserted into the enlarged portion of a keyhole slot in another structural member such that the junction between the structural members is accomplished by sliding the standoff rivet along the keyhole slot to be located at the closed end of the narrowed portion of the keyhole slot.

The plug of the present invention is shaped so as to remain affixed within the enlarged portion of the keyhole slot. The device is affixed into that enlarged portion by means of a pair of flexible latches that are molded into the main body of the plug and which are preferably biased outwardly. As such, the plug can be inserted easily into the enlarged portion of the keyhole slot and the flexible latches snap onto the thickness of a structural member to easily but firmly hold the plug into the affixed position.

The plug is constructed of predetermined dimensions such that it physically interferes with the movement of the standoff rivet from its position at the closed end of the narrowed portion of the keyhole slot. By means of the plug, there are opposed surfaces that are a predetermined distance apart. One of those opposed surfaces is located at or near the standoff rivet and physically prevents the movement of the standoff rivet along the narrowed portion of the standoff rivet to the enlarged portion of the keyhole slot where the standoff rivet could become detached.

Preferably, the external surface of plug that faces the standoff rivet is arcuate so as to provide a good contact with that circular rivet. The opposed surface opposite the surface facing the standoff rivet engages the enlarged portion of the keyhole slot such a solid barrier is present to prevent the relative movement between the two structural members and therefore secures the structural members together in a fixed, locked relationship.

Other features of the present device and junction between structural members utilizing the device will become apparent in light of the following detailed description of the a preferred embodiment thereof and as illustrated in the accompanying drawings.

DETAILED DESCRIPTION OF THE INVENTION

Figure 1:
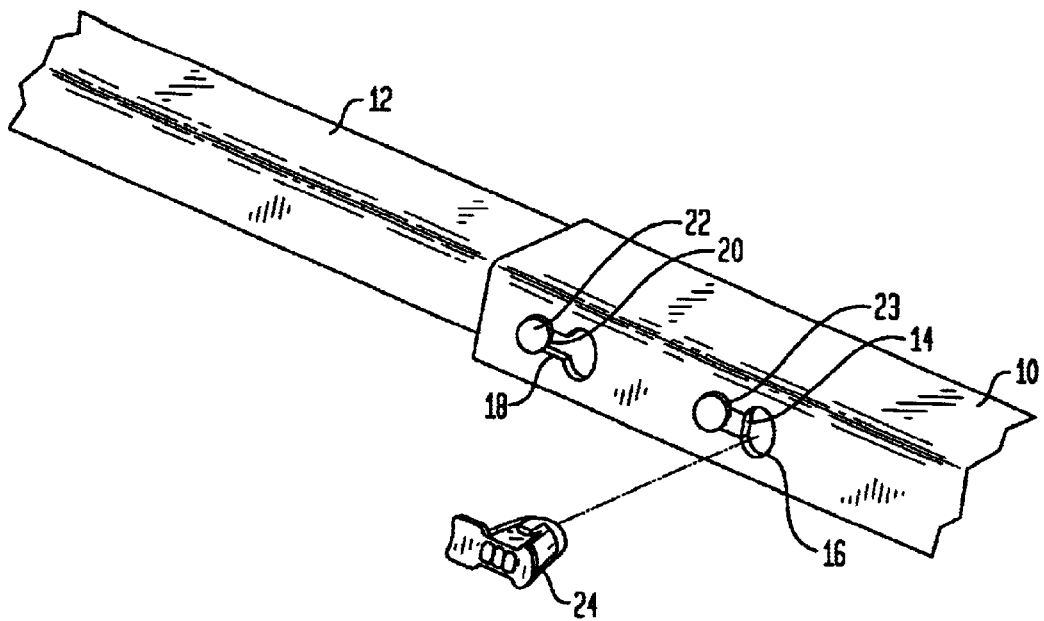
FIG. 1 is a perspective view of a pair of members interlocked together and showing an exploded view of the plug constructed in accordance with the present invention.
Figure 2:
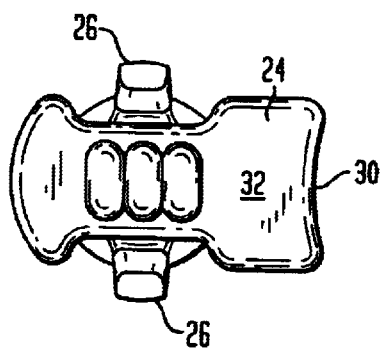
FIG. 2 is a top plan view of the plug of the present invention.
Figure 3:
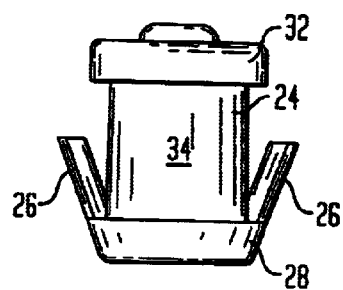
FIG. 3 is an end view of the plug of FIG. 2.
Figure 4:
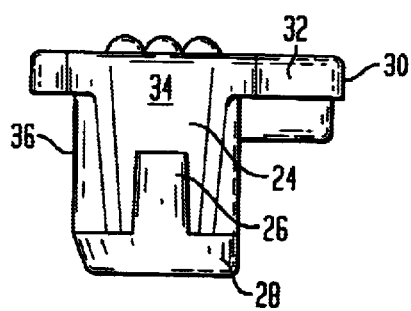
FIG. 4 is a side view of the plug of FIG. 2.
Figure 5:
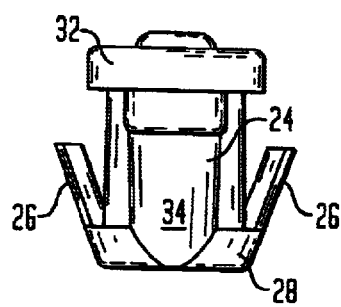
FIG. 5 is another end view of the plug of FIG. 2.
Figure 6:
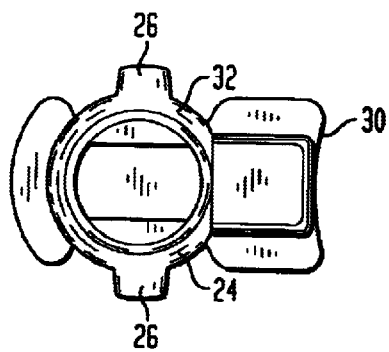
FIG. 6 is a bottom view of the plug of FIG. 2.
Figure 7:
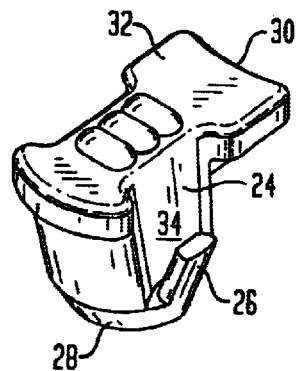
FIG. 7 is a perspective view of the plug of FIG. 2.

Referring now to FIG. 1, there is shown a perspective view of the present invention and where two structural members 10 and 12 are joined together. As is conventional, the structural members 10, 12 are assembled together by means of the one member 10 having at least one keyhole slot 14 formed therein which includes an enlarged portion 16 and a narrowed portion 18 extending therefrom. The other structural member 12 has a standoff rivet 20 with a head 22 and a body (not shown) extending outwardly from the surface of the structural member 12.

The use of keyhole slots and corresponding standoff rivets can be used on a wide variety of structural members, however, as shown in FIG. 1, the preferred structural members are the angle irons since the mating ninety degree surfaces cause less strain on a standoff rivet and therefore such junction is preferably used with the joining of angle irons.

As will be seen, while two keyhole slots and standoff rivets are used to make the connection between the two structural members shown in FIG. 1, and which is preferred with the type of structural members of FIG. 1, only one of the keyhole slot/standoff rivet junctions will be hereinafter explained, it being understood that only one of such junctions may be used with other types of structural members, such as, but not limited to, the building of shelf units.

In accordance with normal means, the structural members 10, 12 are joined together by inserting the head 22 of the standoff rivet 20 through the enlarged portion 16 and sliding the structural members 10, 12 with respect to each other to move the standoff rivet 20 to the affixed position, as shown, where the body of the standoff rivet 20 is located at the closed end 23 of the narrowed portion 18. Since the head 22 is larger than the width of the narrowed portion 18, the structural members 10, 12 are firmly affixed together.

Accordingly, in accordance with the present invention, a plug 24 is inserted into and becomes affixed within the enlarged portion 16 of the keyhole slot 14 and which thereby prevents the standoff rivet 20 from moving back into any position where it could realign with the enlarged portion 16 and which realignment could result in the inadvertent disengagement of the structural members 10, 12. Preferably the plug 24 is a molded plastic material and may be polypropylene or other similar material, such a polyethylene or a high density plastic material. Alternatively other non-plastic materials could be used.

As seen in FIGS. 2–7, taken along with FIG. 1, the plug 24 has a pair of flexible latches 26 that are hingedly affixed to the distal end 28 of the plug 22 and which extend outwardly from the plug 22 and are flexible so as to be able to flex inwardly whereas an inherent bias tends to cause the flexible latches 26 to spring back to their outward positions.

As can therefore be seen, as the plug 22 is inserted into he enlarged portion 16 of the keyhole slot 14 of FIG. 1, the flexible latches 26 can move inwardly as they pass through the enlarged portion 16 of the keyhole slot 14 and then spring outwardly so as to trap the structural member 10 between the flexible latches 26 and an enlarged plug head 32, thereby causing the plug 24 to lock into position when inserted into the enlarged portion 16 of the keyhole slot 14.

As described, the plug 24 has a enlarged plug head 32 that, when inserted in its operative position, abuts against the external surface of the structural member 10 (FIG. 1) to prevent the plug 24 from passing through the enlarged portion 16 of the keyhole slot 14. Again, the actual geometry or shape of the plug head 32 may be any configuration as long as the physical dimensions prevent the plug head 32 from passing through the enlarged portion 16 of the keyhole slot 14.

The dimensions of the plug head 32 are such that it physically interferes with the movement of the standoff rivet 20, and thus prevents relative movement between the two structural members 10, 12, so that the structural member 12 having the standoff rivet 22 can not move relative to the other structural member 10 where the head of the standoff rivet 22 could become realigned with the enlarged portion 16 of the keyhole slot 14 and become separated.

In addition, one exterior surface 30 of the plug head 32 is located close to or abutting the standoff rivet 22 when the plug 22 is located in its installed position within the enlarged portion 16 of the keyhole slot 14 and that external surface 30 may be arcuate so as to conform to the configuration of the normal body of a standoff river 22, that is, circular. Thus, the arcuate exterior surface 30 fits snugly against the standoff rivet 20 and aids in the locking mechanism.

The plug body 34, of course, is sized so as to be inserted into the enlarged portion 16 of the keyhole slot 14 and thus preferably can have the particular configuration of the enlarged portion 16. Another important dimension with respect to the plug 24 is the distance or space between the internal surface of the plug head 32 and the external ends 36 of the flexible latches 26 and it is preferred that such distance, show as the dimension A, be sufficient to enclose the thickness therebetween of the structural member 10 so that the plug can be inserted into the enlarged portion 16 so as to seat the external ends 36 against the rear facing surface of the structural member 10 to retain the plug 24 in its locked position.

As a further important dimension, the overall width of the plug 24 must, of course, be sufficient so as to be inserted into its locked position within the enlarged portion 16 of the keyhole shot 14 and have its arcuate exterior surface 30 contact or be located adjacent the standoff rivet 22 and the opposed exterior surface 38 (FIG. 4) bears against the internal edge of the enlarged portion 16 of the keyhole slot 14 to aid in blocking the movement between the structural members 10, 12.

While the preferred embodiments have been described and illustrated, various modifications and substitutions may be made without departing from the scope and spirit of this invention. It is to be understood, therefore, that the present invention has been described by way of illustration and not limitation.

We claim:

1. A plug inserted into a structural member having a keyhole slot with an enlarged portion and a narrowed portion, said plug comprising a one piece, molded plastic body dimensioned to fit within an enlarged portion of a keyhole slot, said body having at least one flexible latch formed therein interfit within an enlarged portion of a keyhole slot to retain the plug within an enlarged portion, said plug having a predetermined dimensions to physically block a standoff rivet from moving from the narrowed portion of a keyhole slot to an enlarged portion of a keyhole slot.

2. A plug as defined in claim 1 wherein said plug is comprised of a one piece plastic molded construction.

3. A plug as defined in claim 1 wherein said plug has an arcuate exterior surface adapted to conform to the configuration of a standoff rivet.

4. A plug as defined in claim 2 wherein said plug is comprised of polypropylene.

5. A plug as defined in claim 1 wherein said at least one flexible latch comprises two flexible latches oppositely disposed on said plug.

6. A plug as defined in claim 1 wherein said at lest one flexible latch is biased so as to snap fit said plug into an enlarged portion of a keyhole slot.

7. A plug as defined in claim 6 wherein said at least one flexible latch is biased outwardly from said plug.

8. A plug as defined in claim 7 wherein said at least one flexible latch comprises two flexible latches oppositely disposed on said plug.

9. A junction of two structural members, wherein one of said structural members has a keyhole slot having an enlarged portion and a narrowed portion having a closed end, and the other of said structural members has a standoff rivet extending therefrom, said standoff rivet passing through said keyhole slot and located at the closed end of said narrowed portion of said keyhole slot, a plug affixed within said enlarged portion of said keyhole slot, said plug having a main body and having at least one flexible latch extending outwardly from said main body, said flexible latch adapted to snap fit within said enlarged portion of said keyhole slot to retain said plug to said one member, said plug being dimensioned to have a outer surface that extends outwardly to prevent said standoff rivet from being displaced away from said closed end to said enlarged portion of said keyhole slot.

10. A junction of two structural members as defined in claim 9 wherein one of said structural member has two keyhole slots and said other of said structural members has two standoff rivets.

11. A junction of two structural members as defined in claim 9 wherein said at least one flexible latch comprises a pair of flexible latches oppositely extending outwardly from said plug.

12. A junction of two structural members as defined in claim 9 wherein said plug is a one piece molded plastic construction.

13. A junction of two structural members as defined in claim 12 wherein said plug is comprised of polypropylene.

* * * * *